Н3,374,205
PRODUCTION OF PERACETIC ACID
Anthony Rustin and Louis C. S. Fernandes, Shawinigan, Quebec, Canada, assignors to Shawinigan Chemicals Limited, Montreal, Quebec, Canada, a corporation of Canada
No Drawing. Filed Dec. 30, 1964, Ser. No. 422,446
9 Claims. (Cl. 260—502)

ABSTRACT OF THE DISCLOSURE

A method for the production of stable, crude peracetic acid solutions by organic liquid phase oxidation of acetaldehyde in the presence of a manganese salt as catalyst. Manganese salts also catalyze an extremely rapid decomposition of product peracetic acid; this decomposition is retarded sufficiently by the addition of water to the crude product mixture to enable more permanent methods of stabilization to be carried out.

---

This invention relates to the production of peracetic acid by the liquid phase oxidation of acetaldehyde in the presence of metal salt catalysts. More particularly, this invention relates to the production of stable peracetic acid by liquid phase oxidation in presence of manganese salts.

The oxidation of acetaldehyde to peracetic acid in organic solution in the presence of metal salt catalysts is known. The salts of transition metals generally have found use in this oxidation, with salts of copper, cobalt, iron and chromium and especially the acetates and chlorides of these metals being preferred. However the metal salts, as well as catalyzing the formation of peracetic acid, also catalyze the decomposition of peracetic acid to acetic acid, even when the metal salts are present in very small quantities. In order to prevent decomposition during concentration and purification, peracetic acid made with the aid of metal salt catalysts is normally treated to remove the metal salts or to complex them. Thus, peracetic acid processes of this type usually involve either addition of a stabilizer such as picolinic acid or 8-hydroxyquinoline to the reaction mixture before purification, or a flash evaporation to separate the metal salts as residue, or both of these expedients.

It has been known for many years that manganese salts exert a particularly active catalytic effect when peracetic acid is formed by oxidation of acetaldehyde, but manganese salts have not been used successfully as catalysts in commercial peracetic acid processes due to their extremely active decomposing effect on the formed peracid. For example, as little as one part per million of manganese based on peracetic acid will cause an organic solution of peracetic acid to decompose within seconds, even in the presence of many of the known peracetic acid stabilizers. Thus peracetic acid produced by oxidation of acetaldehyde with the aid of a manganese salt catalyst cannot usually be purified, as it tends to decompose before the manganese can be separated from it by flash evaporation.

It has now been found that the decomposition of peracetic acid in the presence of a manganese salt in a crude oxidation mixture can be substantially retarded by the addition of water. In the production of peracetic acid by oxidation of acetaldehyde in the presence of manganese salt catalyst, the addition of water preferably is made as soon as the maximum or desired conversion to peracetic acid has taken place; such addition is effective to retard the decomposition of the peracetic acid sufficiently to enable flash evaporation to be carried out for permanent stabilization. The addition of water in this way makes it feasible to produce peracetic acid from acetaldehyde using manganese salt catalysts which preferably are employed in amounts sufficient to provide 0.00005% to 0.001% of manganese, based on the weight of the acetaldehyde present.

The invention therefore consists in a process for the production of peracetic acid which comprises (1) reacting liquid acetaldehyde and oxygen in an organic solvent in the presence of a manganese salt oxidation catalyst to form a product mixture comprising peracetic acid and (2) adding water to the product mixture before said product mixture is subjected to distillation or flash evaporation, said addition of water being effective to retard appreciably the decomposition of the peracetic acid in said product mixture. The invention will be shown further by the following example.

This example was performed in a tubular reactor constructed of 4.6 m. of 317 type stainless steel tubing having an outside diameter of about 6.4 mm. and a wall thickness of 0.88 mm., wound into a helix of approximately 76 mm. diameter and mounted vertically. A mixture of acetaldehyde in acetic acid diluent and a solution of $MnCl_2 \cdot 4H_2O$ in acetic acid were continuously blended together to form a liquid feed stream containing 8% acetaldehyde, 92% acetic acid and 0.000075% $MnCl_2 \cdot 4H_2O$, all percentages being by weight. This corresponds to a proportion of manganese, based on the weight of acetaldehyde, of approximately 0.00026%. This liquid stream was introduced immediately after blending into the bottom of the reactor at a feed rate of 2250 ml./hr. Gaseous oxygen in the amount stoichiometrically required to react with the acetaldehyde to form peracetic acid was introduced into the bottom of the reactor through a separate inlet. The temperature of reaction was maintained uniform by means of two external water baths which completely immersed the reactor, maintaining the first third of the reactor at a temperature of 45° C. and the last two thirds at 60° C.

At the top of the reactor, the product mixture leaving the reactor tube passed through a T-fitting. The side arm of this fitting was attached to a pump which was connected so that either water or acetic acid diluent could be pumped into the product mixture. It was found that water or diluent introduced in this way became thoroughly blended with the product mixture in the apparatus used. The side arm could be closed off by a valve when it was desired to introduce no water or diluent. After passing through the T-fitting, the product mixture was passed through a cooled gas-liquid separator, in which the unused oxygen and any other non-condensible gases were separated and vented through brine condensers and a pressure regulator to the atmosphere, and in which the liquid mixture remaining was cooled to 20° C. A sampling part enabled samples to be taken for analysis from the liquid stream leaving the separator. The apparatus was arranged so that the time taken for liquid to pass from the top of the reactor through the separator to the sampling port averaged less than 1 minute.

EXAMPLE

Part A

Reaction was carried out under the conditions described above. The valve on the side arm was closed. A sample of crude acetaldehyde oxidation mixture containing peracetic acid was withdrawn through the sample port; it began to boil spontaneously within thirty seconds and could not be analyzed.

*Part B*

Reaction was carried out as in Part A. The valve on the side arm was opened and 128 ml./hr. of water was admixed with the stream of product mixture. A sample withdrawn from the sample port showed no sign of boiling nor of any rapid temperature rise due to peracid decomposition. A portion of the sample was analyzed immediately, and further portions were analyzed after being kept in open containers at 23° C. for different periods. The analytical results are given below, the percentages being by weight.

INITIAL ANALYSIS

|  | Percent |
|---|---|
| Peracetic acid | 6.85 |
| Acetaldehyde | 0.72 |
| Water | 6.16 |
| Acetic acid | 86.27 |

Proportion of the peracetic acid initially present which had decomposed:

| After: | Percent |
|---|---|
| 3 minutes | 2.70 |
| 6 minutes | 4.86 |
| 9 minutes | 6.50 |

*Part C*

Reaction was carried out as in Part A. The valve on the side arm was opened and 128 ml./hr. of acetic acid was introduced into the product mixture. A sample withdrawn from the sample port boiled spontaneously within thirty seconds of being exposed to atmospheric pressure and could not be analyzed. This part of the example shows conclusively that the stabilizing action of water is specific and that the stabilization achieved is not merely due to dilution of the product mixture.

The amount of water which must be added to the product mixture in order substantially to stop the oxidation reaction and slow peracetic acid decomposition will depend upon many factors, including the concentration of manganese salt present, the volume of product mixture treated, and the efficiency of blending of the added water with the product mixture. The amount will also depend largely upon the degree of stability desired. If, for example, a flash evaporation is to be performed upon the product mixture very shortly after it leaves the reactor, a small amount of water will suffice to stop reaction and to stabilize the product temporarily. If, however, there is a delay of 5 or 6 minutes before flash evaporation (as is often the case in commercial plants, due to the time taken in pumping the product mixture between units), then more water will be required. It is commercially disadvantageous to add amounts of water in excess of the amount by weight of peracetic acid present, as these large amounts are expensive to remove from the diluent, which is normally returned to the process after peracetic acid separation. If less water than peracetic acid by weight is present, the water can easily be separated from the acetic acid in the form of a peracetic acid-water azeotrope having a 50–50% by weight composition approximately. The azeotrope itself is not objectionable in further peracetic acid processing, as peracetic acid is usually sold in aqueous solution. Quantitatively the suitable proportion of water to be added can be said to vary between about 40% and 100% by weight of the peracetic acid (as 100% peracetic) to be stabilized, with perferably between 65% and 85% being added. Part B of the example illustrates the addition of about 75% by weight of water, based on the weight of the peracetic acid present.

It should be emphasized that water in the process of the present invention does not act as a stabilizer in the normal sense of the word. For example, if an aqueous solution of peracetic acid which contains manganese is stored for more than a few minutes it will decompose unless refrigerated. The purpose of the water as used in the present invention is to retard temporarily the decomposition of the peracetic acid until other more permanent stabilization measures can be taken. There is also evidence that the addition of water slows or stops further oxidation of acetaldehyde to peracetic acid, so that the process of the invention can be used to shortstop acetaldehyde oxidation in the presence of manganese salt catalysts, as well as to retard the decomposition of the peracetic acid produced before such addition.

It has been found further that water will also slow decomposition of peracetic acid containing known metal salt oxidation catalysts, such as cobalt salts for example. However, peracetic acid containing and prepared using such salts as catalysts is much more stable than that containing and prepared in the presence of manganese salts, and can usually be maintained without appreciable decomposition for the short time necessary for transport between the reactor and flash evaporation equipment by conventional expedients such as cooling. It is intended nevertheless to include within the scope of this invention the use of water with such other salts in a manner equivalent to that disclosed herein, even though such use of water does not have the same extent of utility in such cases due to the greater intrinsic stability of the mixtures.

Numerous variations and modifications can be made in the various specific expedients described herein without departing from the scope of the invention which is defined in the following claims.

We claim:
1. A process for the production of peracetic acid which comprises
    (a) reacting liquid acetaldehyde and oxygen in an organic solvent in the presence of a manganese salt oxidation catalyst to form a product mixture comprising peracetic acid and
    (b) adding water to the product mixture before said product mixture is subjected to distillation or flash evaporation,
        said addition of water being effective to retard appreciably the decomposition of the peracetic acid in said product mixture.

2. A process as claimed in claim 1 in which the manganese salt is $MnCl_2 \cdot 4H_2O$.

3. A process as claimed in claim 1 in which the manganese salt is used in an amount sufficient to provide 0.00005% to 0.001% of manganese, based on the weight of the acetaldehyde.

4. A process as claimed in claim 1 in which the proportion of water added is between 40% and 100% by weight of the peracetic acid formed.

5. In a process for the production of peracetic acid by oxidation of acetaldehyde with oxygen in the liquid phase in the presence of an organic solvent and a manganese salt catalyst, the method of stabilizing the peracetic acid content of the crude product mixture against decomposition during subsequent processing steps which comprises adding water to said product mixture substantially at the time when the maximum concentration of peracetic acid in said oxidation of acetaldehyde has been reached, said water being added in an amount effective to retard appreciably the decomposition of the peracetic acid content of the reaction mixture.

6. A process for the production of peracetic acid by the oxidation of acetaldehyde with oxygen in the liquid phase in the presence of an organic solvent and a manganese salt catalyst, characterized in that water is added to the mixture containing peracetic acid when the oxidation of acetaldehyde has proceeded to the desired extent, whereby the decomposition of peracetic acid in said mixture is substantially retarded.

7. A process as claimed in claim 6, characterized in that a proportion of water between 40% and 100% by weight of the peracetic acid is added to the mixture.

8. A process according to claim 1 in which the manganese salt is used in an amount sufficient to provide 0.00005 to 0.001% of manganese, based on the weight of the acetaldehyde, and the solvent is acetic acid.

9. A process according to claim 8 in which the proportion of water added is between 40% and 100% by weight of the peracetic acid formed.

References Cited
UNITED STATES PATENTS

| | | | |
|---|---|---|---|
| 1,179,421 | 4/1916 | Galitzenstein | 260—502 |
| 3,162,678 | 12/1964 | Hayes | 260—502 |
| 3,228,977 | 1/1966 | Sennewalld | 260—502 |

LORRAINE A. WEINBERGER, *Primary Examiner.*

M. WEBSTER, *Assistant Examiner.*